United States Patent
Botura et al.

(10) Patent No.: US 9,555,894 B2
(45) Date of Patent: Jan. 31, 2017

(54) AIRCRAFT ICE PROTECTION OPTIMIZATION BASED ON ICE-DETECTION INPUT

(71) Applicant: GOODRICH CORPORATION, Charlotte, NC (US)

(72) Inventors: Galdemir Cezar Botura, San Diego, CA (US); Dave Bert Sweet, Canal Fulton, OH (US); James Thomas Hindel, Tallmadge, OH (US); Darren Glenn Jackson, Prior Lake, MN (US)

(73) Assignee: GOODRICH CORPORATION, Charlotte, NC (US)

( * ) Notice: Subject to any disclaimer, the term of this patent is extended or adjusted under 35 U.S.C. 154(b) by 287 days.

(21) Appl. No.: 13/871,207

(22) Filed: Apr. 26, 2013

(65) Prior Publication Data

US 2013/0284856 A1  Oct. 31, 2013

Related U.S. Application Data

(60) Provisional application No. 61/800,310, filed on Mar. 15, 2013, provisional application No. 61/639,366, filed on Apr. 27, 2012.

(51) Int. Cl.
*B64D 15/12* (2006.01)
*B64D 15/20* (2006.01)

(52) U.S. Cl.
CPC ............ *B64D 15/12* (2013.01); *B64D 15/20* (2013.01)

(58) Field of Classification Search
CPC ................................................. B64D 15/22
See application file for complete search history.

(56) References Cited

U.S. PATENT DOCUMENTS

| | | | | |
|---|---|---|---|---|
| 4,611,492 A | * | 9/1986 | Koosmann | 73/579 |
| 4,980,673 A | * | 12/1990 | Kleven | 340/581 |
| 5,140,135 A | * | 8/1992 | Freeman | 219/497 |
| 5,206,806 A | * | 4/1993 | Gerardi et al. | 340/582 |
| 5,922,958 A | * | 7/1999 | Schugt | 73/596 |

(Continued)

FOREIGN PATENT DOCUMENTS

| CN | 101590914 A | 12/2009 |
|---|---|---|
| CN | 101695959 A | 4/2010 |

(Continued)

OTHER PUBLICATIONS

Ray, M. D., Nesnidal, M., and Socha, D., "Optical Detection of Airborne Ice Crystals and Liquid Water Droplets," 1st AIAA Atmospheric and Space Environments Conference, San Antonio, TX, Jun. 22-25, 2009, AIAA 2009-3863.*

(Continued)

*Primary Examiner* — Brian M O'Hara
*Assistant Examiner* — Michael Kreiner
(74) *Attorney, Agent, or Firm* — Cantor Colburn LLP

(57) ABSTRACT

An aircraft ice protection system (10) comprises an ice protection device (21), an onboard power source (30), a supply line (31) from the power source (30) to the device (21), a controller (41) which controls the line (31), and an optimizer (50) which conveys operation-optimizing instructions (51) to the controller (41). An ice detector (60) provides an input (70) to the optimizer (50) and this ice-condition input (70) is used to generate the operation-optimizing instructions (51).

10 Claims, 12 Drawing Sheets

(56) References Cited

U.S. PATENT DOCUMENTS

| | | | | |
|---|---|---|---|---|
| 5,955,887 | A * | 9/1999 | Codner et al. | 324/689 |
| 6,069,565 | A * | 5/2000 | Stern et al. | 340/583 |
| 6,759,962 | B2 * | 7/2004 | Severson et al. | 340/580 |
| 6,847,903 | B2 * | 1/2005 | Severson et al. | 702/54 |
| 7,104,502 | B2 * | 9/2006 | Otto et al. | 244/134 F |
| 7,312,713 | B2 * | 12/2007 | Alfano | G08B 19/02 |
| | | | | 250/339.07 |
| 7,370,525 | B1 * | 5/2008 | Zhao | B64D 15/20 |
| | | | | 73/170.17 |
| 7,845,221 | B2 * | 12/2010 | Severson et al. | 73/170.02 |
| 8,028,959 | B2 | 10/2011 | Greene | |
| 8,037,750 | B2 * | 10/2011 | Heuer et al. | 73/170.26 |
| 8,144,325 | B2 * | 3/2012 | Ray et al. | 356/342 |
| 2004/0231410 | A1 | 11/2004 | Bernard et al. | |
| 2010/0123044 | A1 * | 5/2010 | Botura | 244/134 D |
| 2011/0288776 | A1 * | 11/2011 | Lilie et al. | 702/3 |

FOREIGN PATENT DOCUMENTS

| | | | |
|---|---|---|---|
| EP | 2058228 | A2 | 5/2009 |
| GB | 2447374 | A | 9/2008 |

OTHER PUBLICATIONS

"Ice Protection Systems," SKYbrary Wiki. Article submitted as it appeared on Apr. 10, 2010. Permanent link to the article (as it appeared on Apr. 10, 2010): "http://www.skybrary.aero/index.php?title=Ice_Protection_Systems&oldid=35595".*

Canadian Office Action for Application No. 2,814,061; dated Oct. 7, 2014; 2 pgs.

English Translation of Peoples Republic of China First Office Action for Patent Application No. 201310240230.0; date of issue: Apr. 3, 2015; (untranslated version attached) 14 pgs.

\* cited by examiner

AIRCRAFT ICE PROTECTION OPTIMIZATION BASED ON ICE-DETECTION INPUT

RELATED APPLICATION

This application claims priority under 35 USC §119(e) to U.S. Provisional Patent Application No. 61/639,366 filed on Apr. 27, 2012 and U.S. Provisional Patent Application No. 61/800,310 filed on Mar. 15, 2013. The entire disclosures of these provisional applications are hereby incorporated by reference.

BACKGROUND

An aircraft can encounter icing conditions during when it flies through a cloud containing supercooled droplets having nonzero liquid water contents (e.g., up to 2.5 grams of water per cubic meter of air). As a general rule, for a thermal ice protection system, the most severe icing conditions will occur when the temperature is at its coldest (e.g., approaching −22° F.), the relevant speed is the fastest, and mean droplet size is relatively large (e.g., nearing 50 micrometers). An ice protection system must be designed to protect an aircraft from the most severe conditions.

SUMMARY

An ice protection system is provided which uses ice-detection input data (e.g., liquid water content, mean droplet size, etc.) along with other inputs to optimize operation to effectively and efficiently protect an aircraft in icing conditions.

DRAWINGS

FIGS. 1-12 each show an ice protection system for protecting aircraft surfaces in icing conditions.

DESCRIPTION

Figure 1:
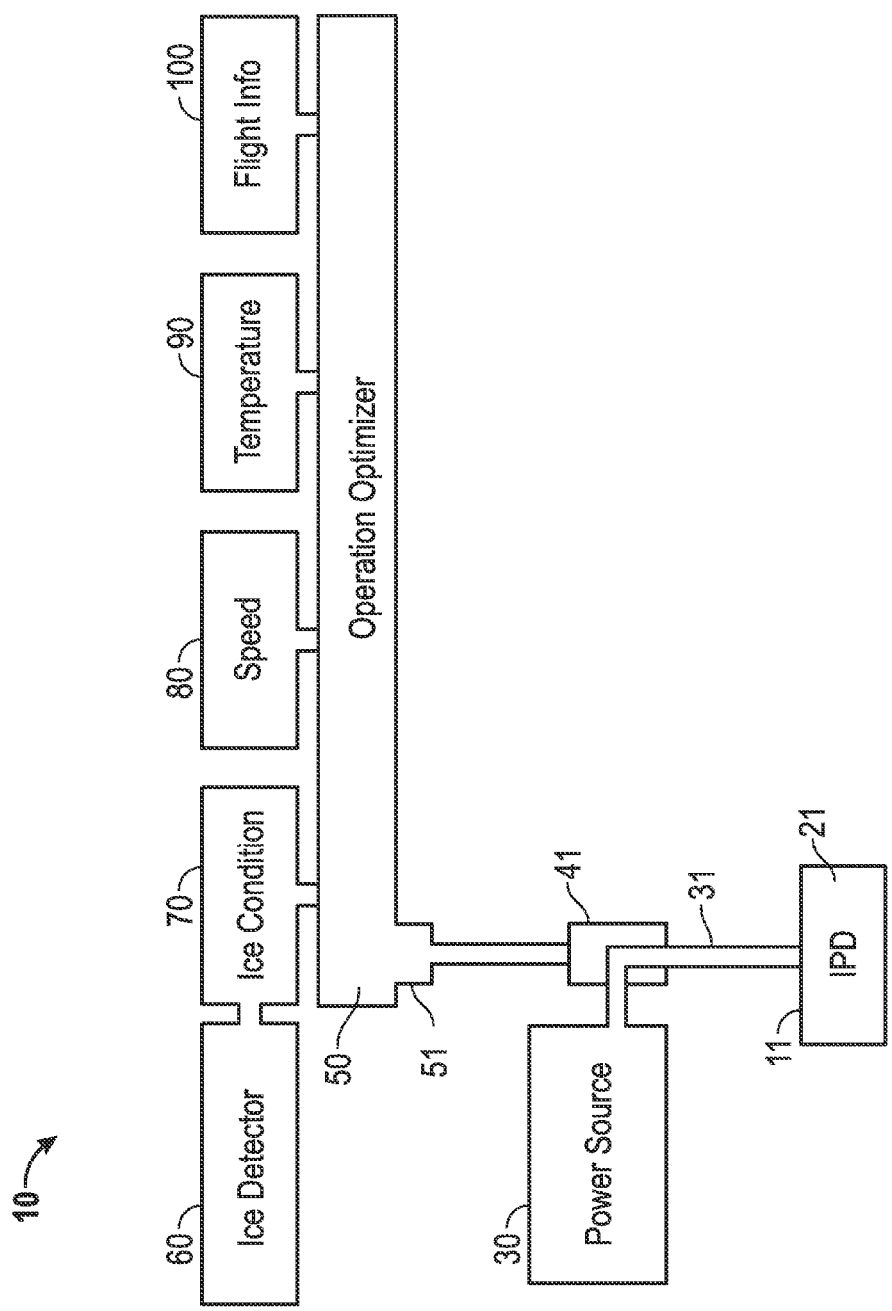
Figure 2:
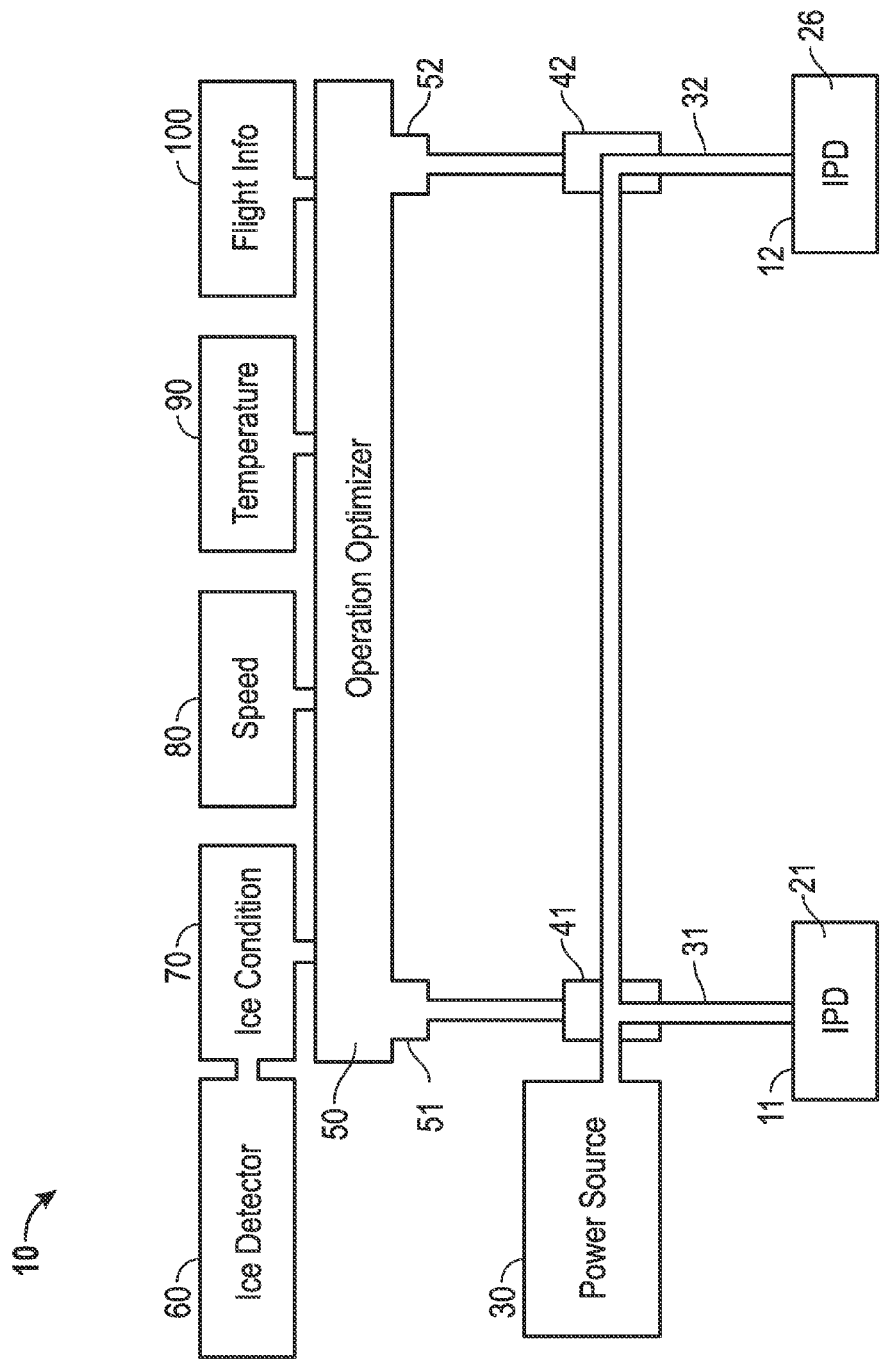
Figure 3:
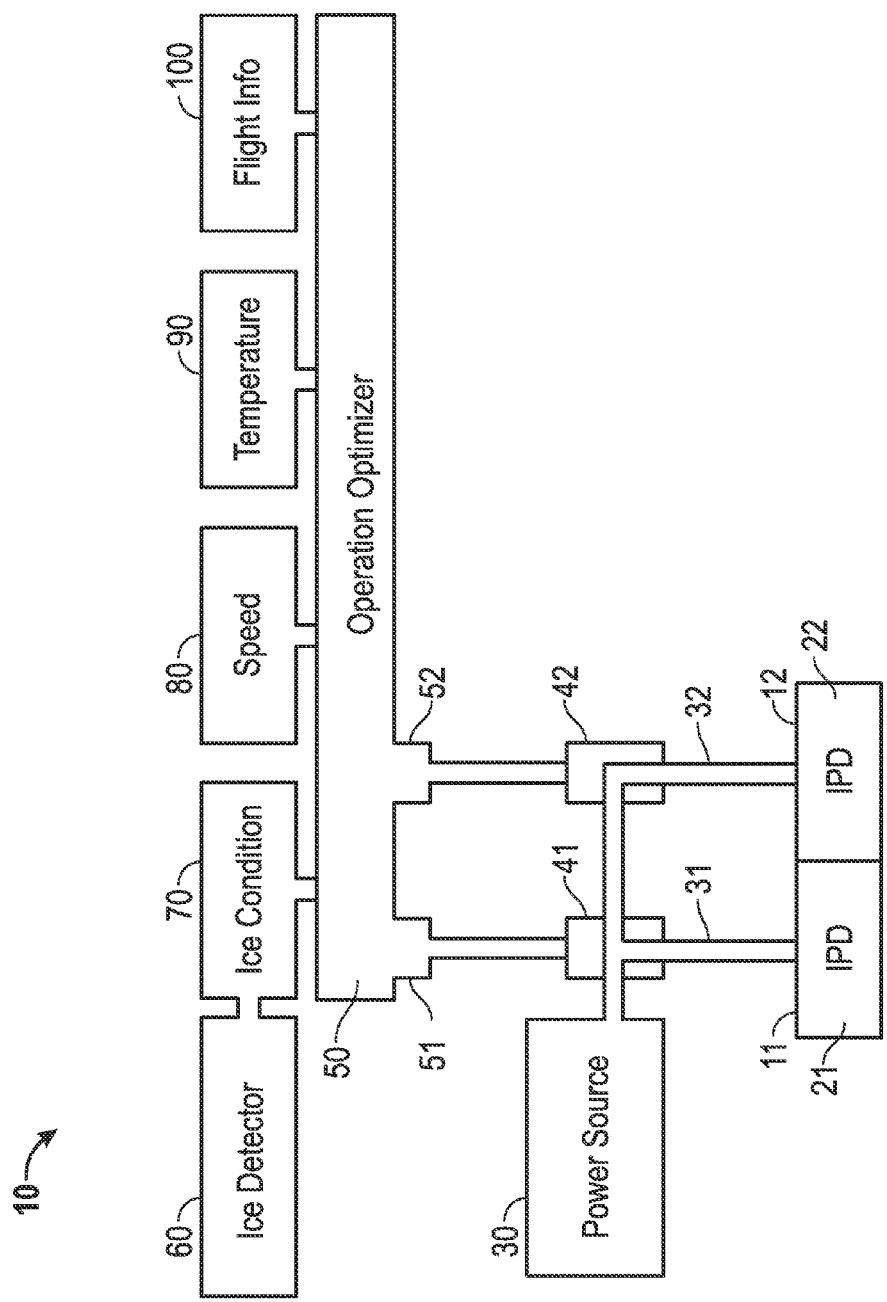
Figure 4:
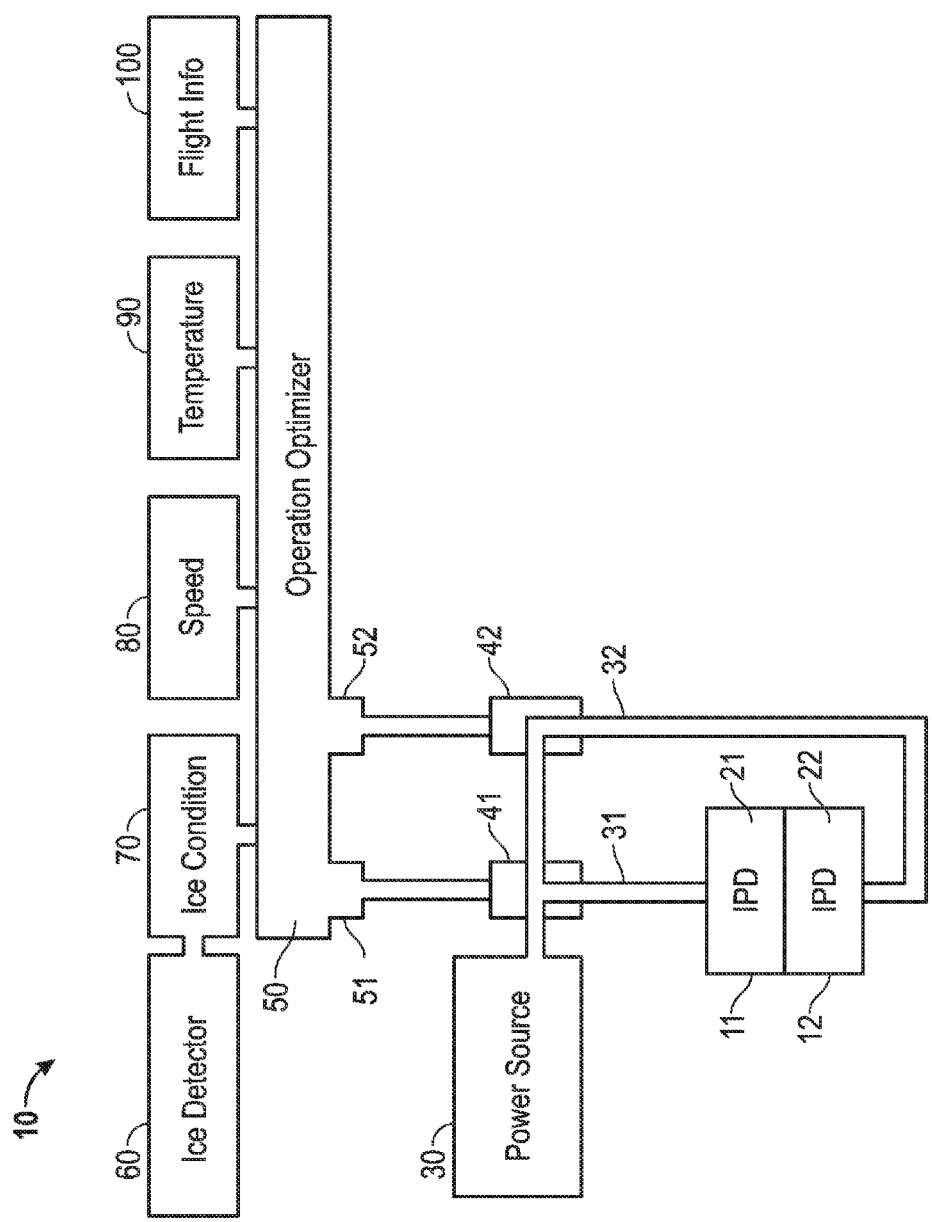
Figure 5:
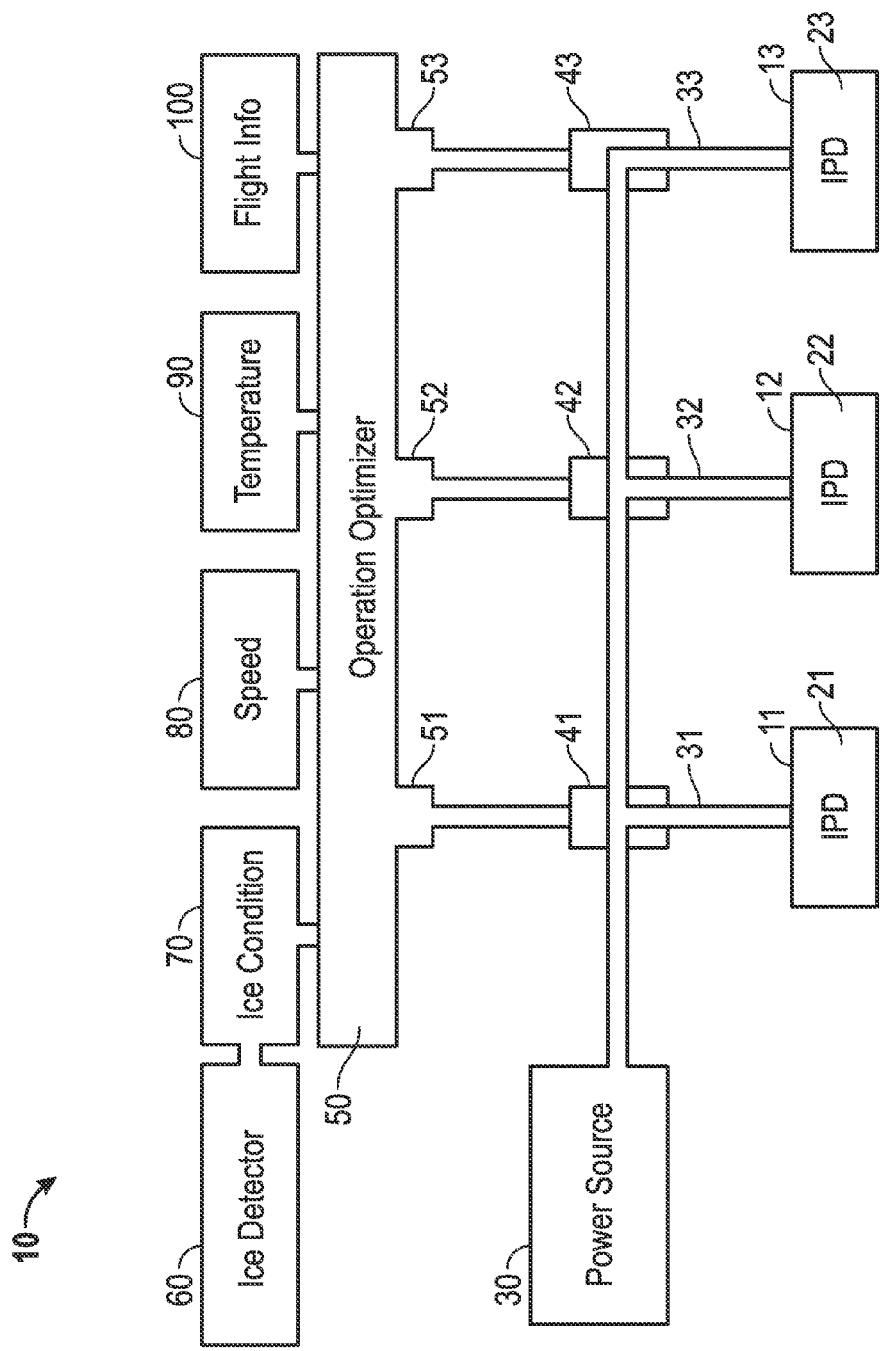
Figure 6:
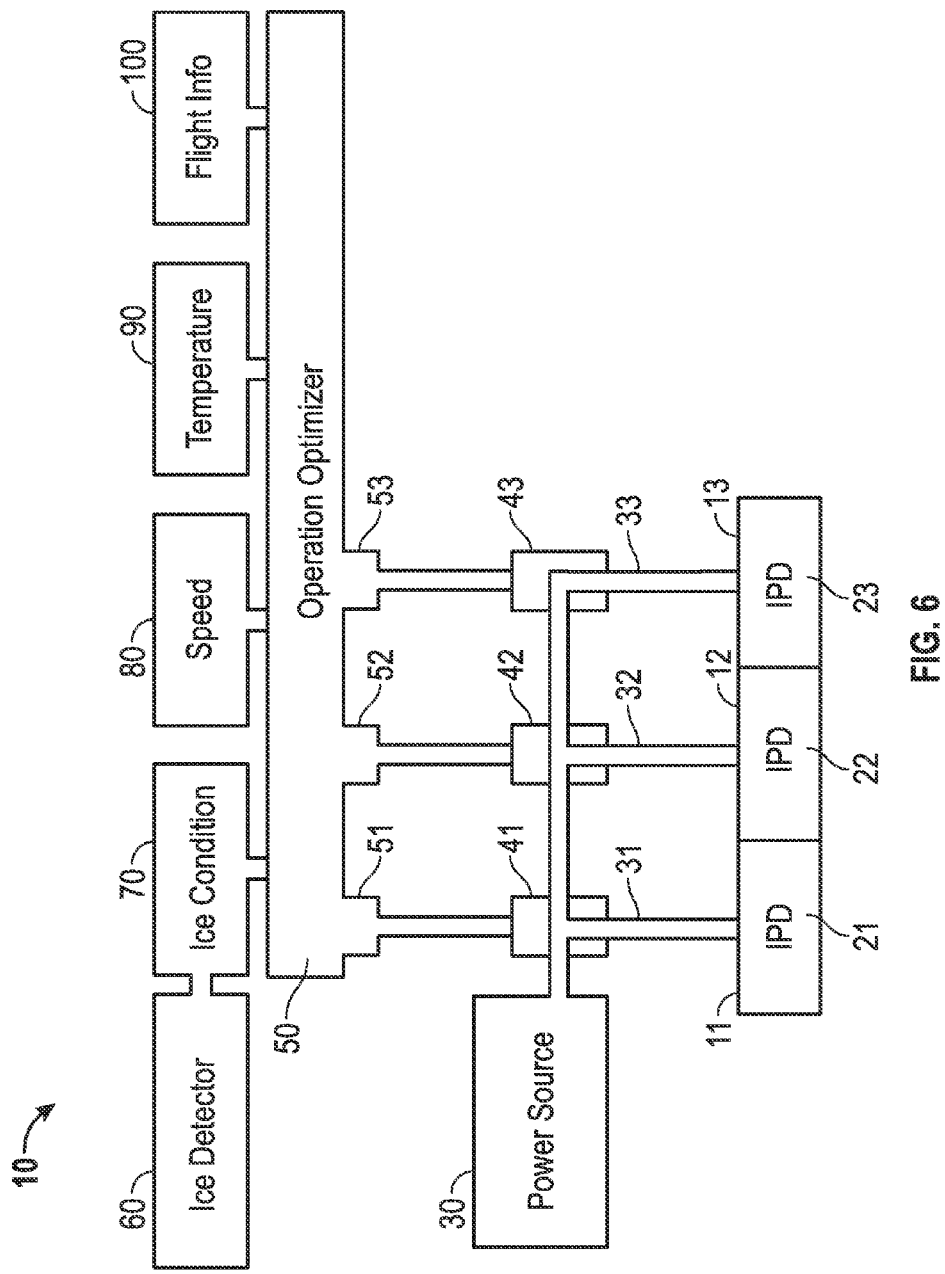
Figure 7:
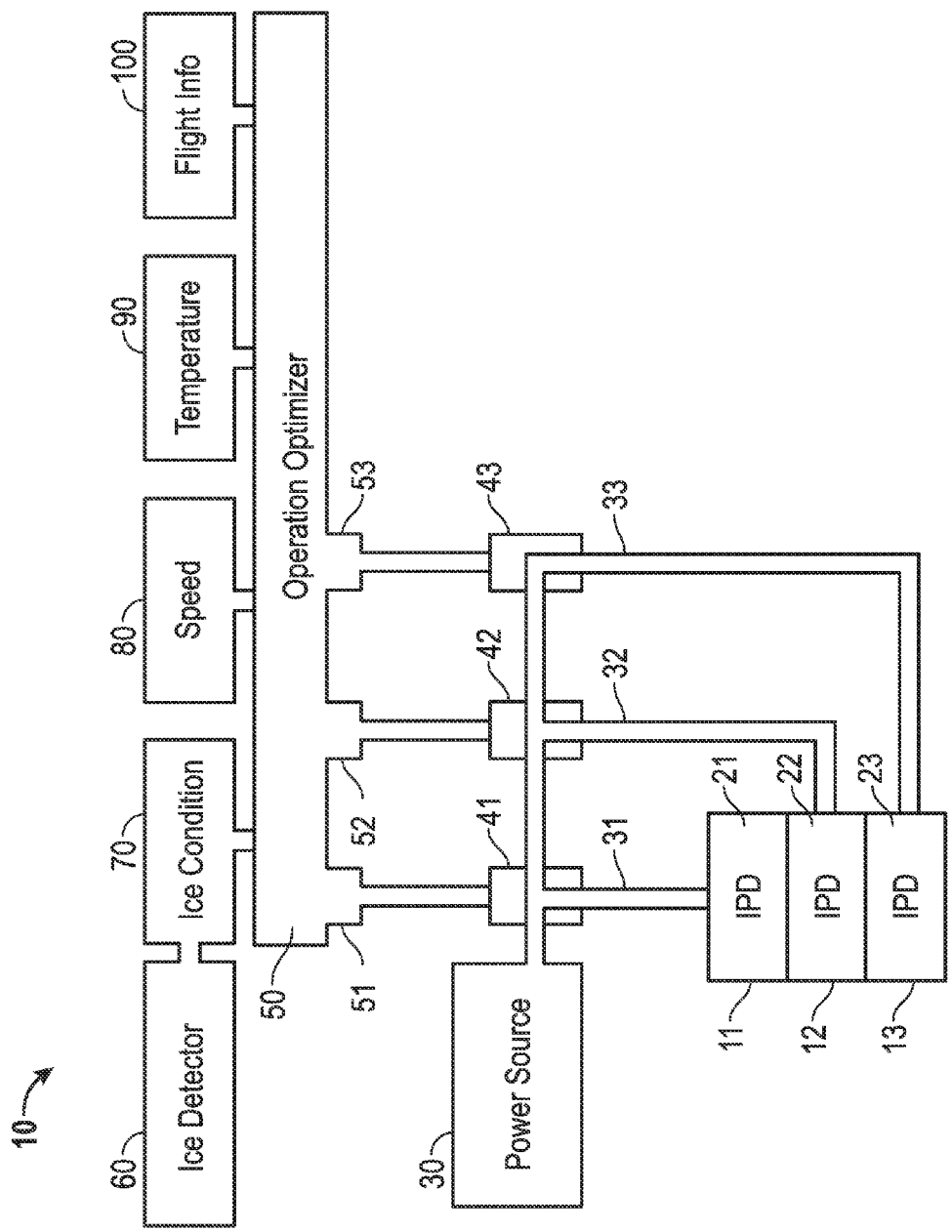
Figure 8:
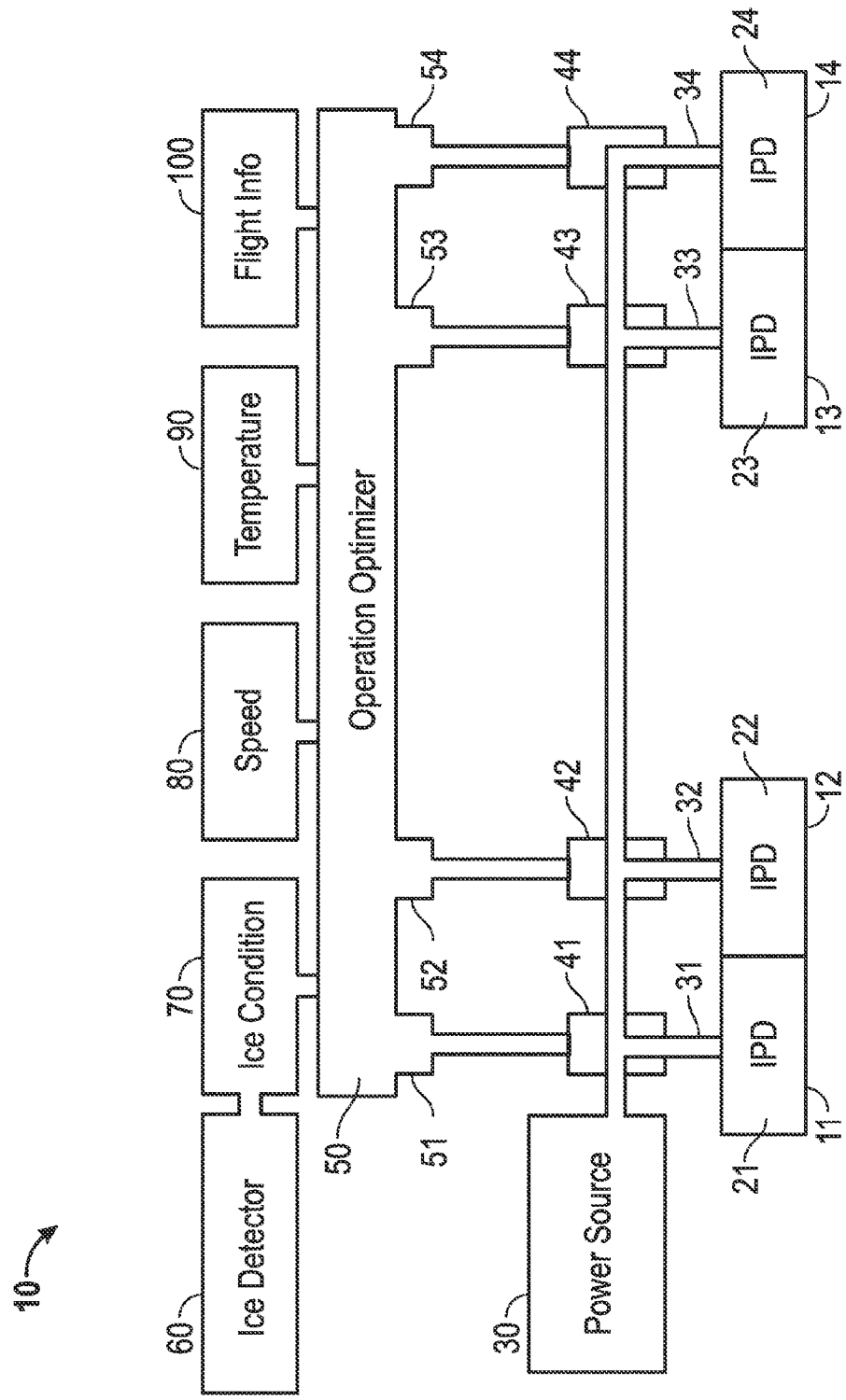
Figure 9:
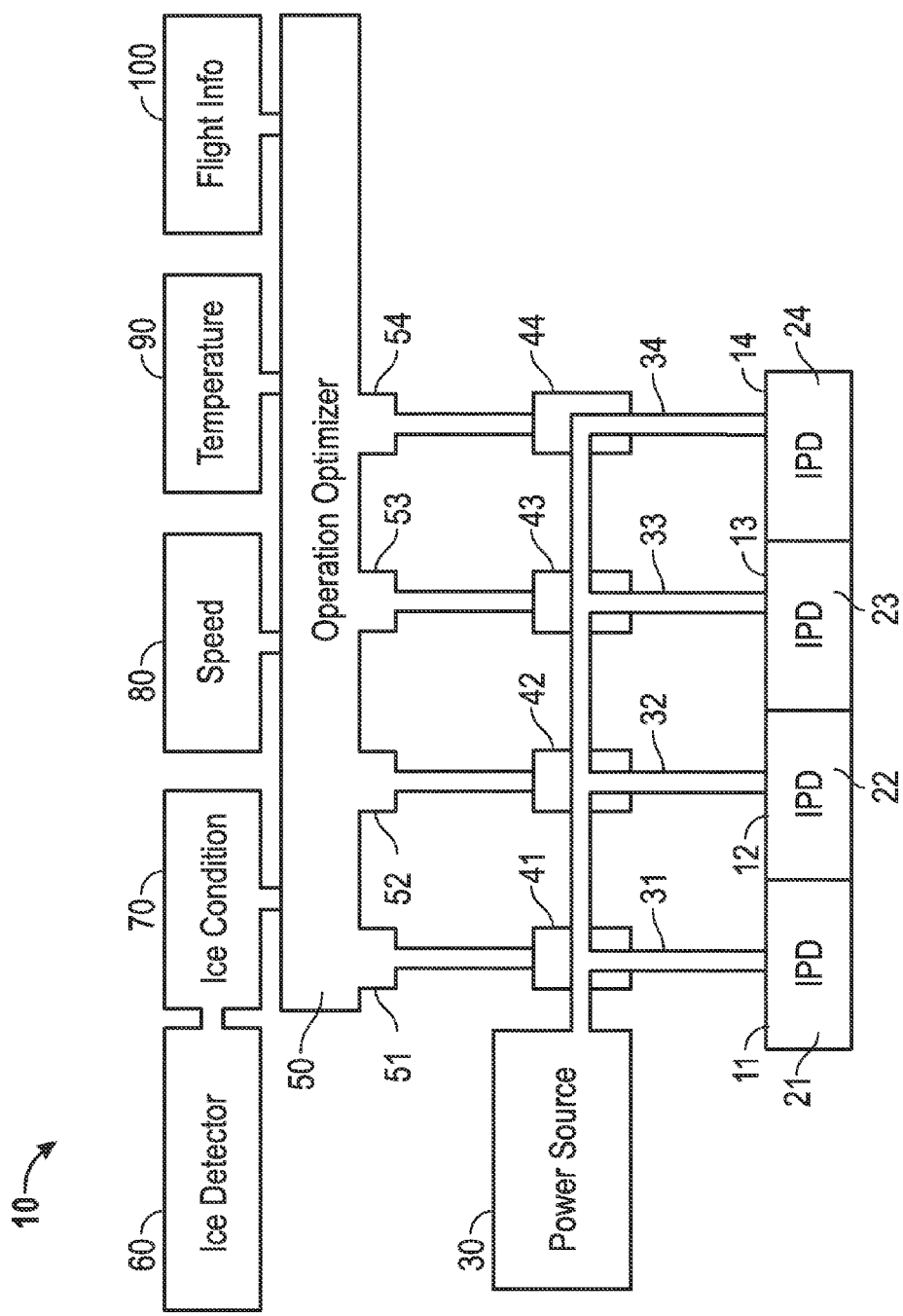
Figure 10:
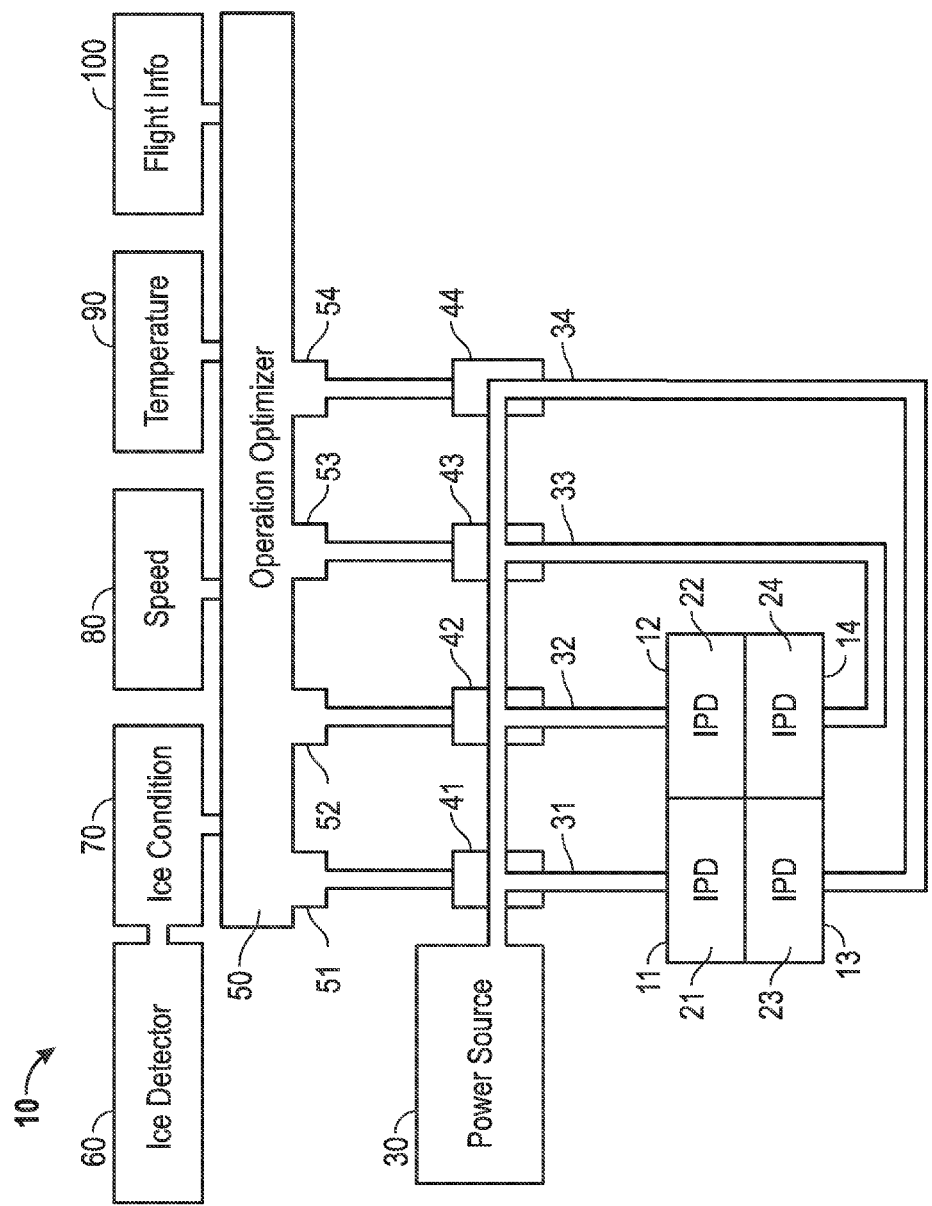
Figure 11:
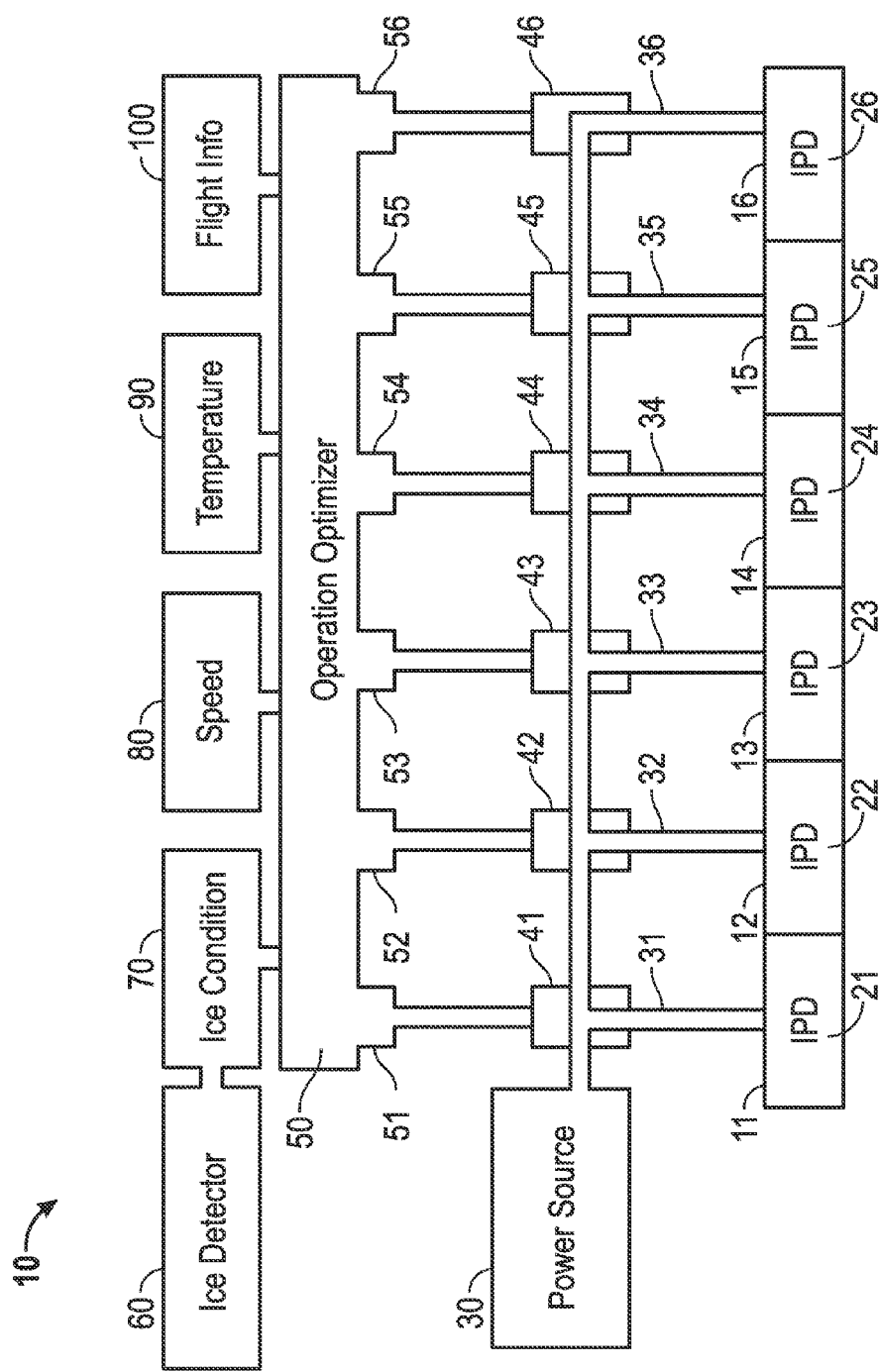
Figure 12:
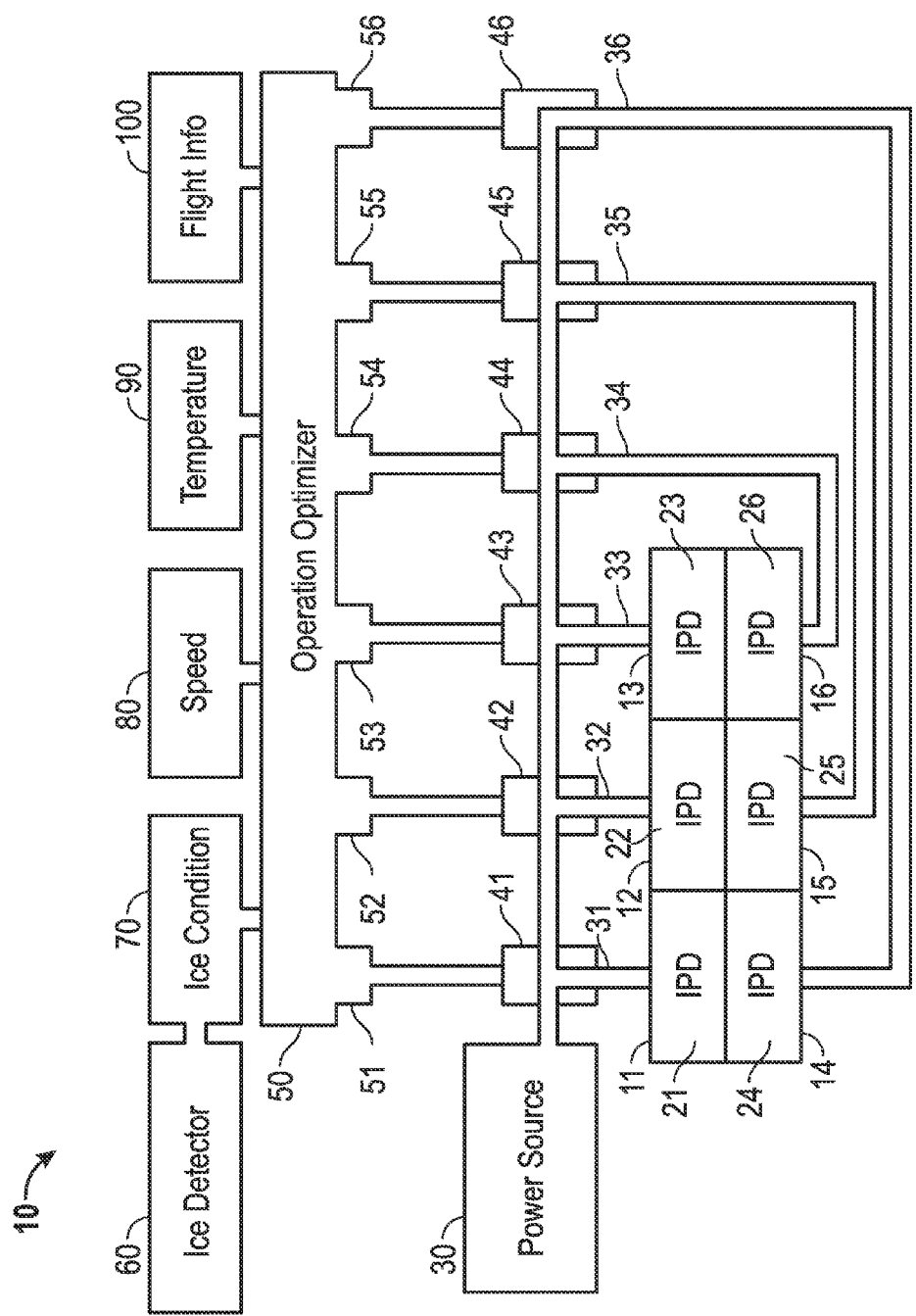

Referring to FIG. 1, the ice protection system 10 is adapted to protect an ice-susceptible region 11. The system 10 comprises an ice protection device 21 associated with the region 11, an onboard power source 30 with a supply line 31 to the ice protection device 21, and a controller 41 which controls power supply through the line 31. An optimizer 50 conveys switching instructions 51 to the controller 41, based at least on an ice detector 60 which provides ice-condition inputs 70 thereto. The optimizer 50 can receive additional inputs, such as an airspeed input 80, an ambient temperature input 90, and/or a flight input 100.

Although the optimizer 50 is schematically shown in the drawings as separate entity from the controller 41, this need not be the case. The optimizer 50, the controller 41, and other system components (including the other controllers 42-46 introduced below) can incorporated into or share installations. The optimizer 50, for example, can be an algorithm contained within a microprocessor integrated with controllers.

Referring to FIGS. 2-12, they each show an ice protection system 10 is adapted to protect at least two regions 11-12 (each having its own line 31-32, controller 41-42, and instructions 51-52), at least three regions 11-13 (each having its own line 31-33, controller 41-43, and instructions 51-53), at least four regions 11-14 (each having its own line 31-34, controller 41-44, and instructions 51-54), and/or at least six regions 11-16 (each having its own line 31-36, controller 41-46, and instructions 51-56). The regions can be located remote from each other (see e.g., FIGS. 2, 5, 8), in spanwise rows (see e.g., FIGS. 3, 6, 8, 9, 10, 11, 12), and/or in chordwise columns (see e.g., FIGS. 4, 7, 10, 12).

The ice protection devices 21-26 can each comprise a heating element which converts electric power into heat. If the ice protection devices 21-26 are of the electrothermal type, the source 30 can comprise an onboard source of AC or DC power and the controllers 41-46 can comprise electric switches, capacitors, pulsing circuitry, or other suitable components. The system 10 could additionally or alternatively employ other types of ice protection devices (e.g., pneumatic thermal devices, electro-impulse systems, pneumatic boots, etc.) and thus additional or other power sources.

The controllers 41-46 can be configured to simply turn the ice protection devices 21-26 on and off. In this case, operational optimization can be achieved by avoiding the activation of ice protection when such is not yet needed. Also, with particular reference to deicing scenarios, device activation can be coordinated with optimum ice thickness so that a deicing cycle is not wasted on an ice thickness well below that which can be tolerated by the aircraft surface. Alternatively, the controllers 41-46 can be adjust power-supply levels to the ice protection devices. This could be accomplished by adjusting the actual power supply levels, by modulation, and/or by adjusting deicing cycle increments. Generally, the more power levels available, the greater the potential for energy savings.

The optimizer 50 can comprise a processor programmed with historical data, mathematical models, and/or developed algorithms allowing it to optimize the efficiency and effectiveness of ice protection. In addition to the data dynamically input during operation of the ice protection system 10, the optimizer 50 can take into consideration non-changing designs features of the respective regions (e.g. airfoil sharpness, ice collection efficiency, proximity to moving parts, etc.). Also, the optimizer 50 can look at the operation of related ice protection devices as a coordinated scheme.

The ice detector 60 can comprise any suitable detecting technology capable of providing the relevant input 70. For example, the detector 60 can comprise cloud-responsive heating elements (see e.g., US20110288776, U.S. Pat. No. 5,140,135, U.S. Pat. No. 4,980,673), vibrating probes which change frequency with ice accretion (see e.g., U.S. Pat. No. 7,104,502, U.S. Pat. No. 6,759,962, U.S. Pat. No. 6,847,903, U.S. Pat. No. 4,611,492), optical mechanisms (see e.g., U.S. Pat. No. 8,144,325, U.S. Pat. No. 6,069,565), temperature-maintaining resistors (see e.g., U.S. Pat. No. 8,037,750), clog-with-ice conduits (see e.g., U.S. Pat. No. 7,984,647, U.S. Pat. No. 7,845,221), ice-thickness-changes-impedance arrangements of electrodes (see e.g., U.S. Pat. No. 6,759, 962, U.S. Pat. No. 5,955,887), acoustic channels (see e.g., U.S. Pat. No. 5,922,958) and/or piezoelectric film arrays (see e.g., U.S. Pat. No. 5,206,806).

A suitable candidate for the ice detector 60 could be an optical ice detector (OID which analyzes circularly polarized light scattered from airborne cloud particles. Such a detector could include a laser apparatus configured to direct a light signal into a cloud, a lens component configured to collect echo signals from a cloud caused by the light signal directed into the cloud, a beam splitter component configured to redirect signals received and passing through the lens component into at least first and second paths and a droplet detector to receive the redirected signals. The droplet detector could include a first signal detector component configured to perform a first color measurement on the first redirected signal, and a second signal detector component configured to perform a second color measurement on the second redirected signal. The droplet detector is configured to use the first and second color measurements to determine liquid water content and droplet diameter distribution for the cloud. (See e.g., U.S. Pat. No. 8,338,785.)

The ice detector 60 detects a non-temperature parameter such as liquid water content (LWC), ice water content (IWC), total water content (TWC), mean drop size, median volumetric drop (MDV), and/or ice thickness (THICK). The significant non-temperature parameter is detected, not estimated, predicted, or otherwise calculated solely from temperature data. Temperature data may be used, however, in conjunction with this parameter to produce the input 70.

The speed input 80 is a non-temperature input which correlates to the impingement speed encountered by droplets on route to the aircraft surface. This input 80, however, need not be a precise measurement of the airspeed, but can be or use other related velocities such as aircraft speed.

The temperature input 90 is an input corresponding to ambient temperature conditions, not the temperature of the ice protection device or associated region. In fact, one advantage of the ice protection system 10 is that it can eliminate the need for surface temperature devices, and thus the corresponding wiring.

Thus, the ice protection system can be characterized by the absence of surface temperatures and/or their input being used to by the optimizer 50 to determine optimum ice protection parameters. That being said, an ice protection system including surface temperature sensors is possible and contemplated.

The input 100 comprises a non-temperature input relating to overall flight. This input 100 can comprise, for example, aircraft altitude (ALT), aircraft speed (SPEED), angle of attack (AOA), flight phase (PHASE), weight on wheels (WOW), and/or the position of movable parts (PART).

By way of example, in a fully-evaporative anti-ice mode, the ice protection device is expected to fully evaporate all impinging water by heating the region 11 to a relatively high temperature. This mode of ice protection is extremely power-intensive and has been traditionally reserved only for critical aircraft areas where at wet runback and/or ice injection cannot be tolerated. Clearly the associated ice protection device 21 must be designed to evaporate impingement in the most severe ice conditions. With the ice protection system 10, power to the evaporative anti-icing device 21 can be reduced when icing conditions are not at their worst. As severe ice conditions often account for less than 5% of all icing conditions during a flight, this would result in substantial power savings.

By way of another example, an anti-icing region can be operated in a fully-evaporative anti-ice mode or a less-power-intensive "running wet" mode depending upon its neighboring deicing regions. If regions 11-13 are arranged in chordwise column, an anti-icing region 12 can be sandwiched between two deicing regions 11 and 13. If these regions are cold enough to cause refreeze, a fully-evaporative mode may not be necessary and the ice protection device 12 can be operated in a running wet mode.

By way of another example, the ice protection system 10 can include an ice protection device 21 reserved solely for use when the input 70 is indicative of supercooled large droplets (SLDs). This ice protection device 21 could be located chordwise aft of most routine devices, in traditionally non-iced areas believed to be plagued by the super large droplets. If the ice detector 60 is an optical detector, it could directly measure the presence of SLD within the icing cloud.

By way of a further example, when regions 11-16 are arranged in a spanwise row, the "on" threshold for the different regions may vary along the row, probably decreasing in the outboard direction.

One may now appreciate the ice protection system 10 uses ice-detection data to optimize operation. Although the system 10, the ice protection devices 21-26, the power source 30, the supply lines 31-36, the controllers 41-46, the optimizer 50, the instructions 51-52, the ice detector 60, the ice condition input 70, the temperature input 80, the speed input 90, and/or the flight-info input 100 have been shown and described with respect to certain embodiments, obvious and equivalent alterations and modifications will occur to others skilled in the art upon the reading and understanding of this specification.

The invention claimed is:

1. An ice protection system adapted to protect at least one ice-susceptible region of an aircraft, said system comprising:
    an ice protection device associated with each region;
    an onboard power source;
    a supply line connecting the onboard power source to each ice protection device;
    a controller for each ice protection device, which controls power supply through the supply line based on an ice-condition input and historical data of ice-condition input;
    an optimizer which conveys instructions to each controller; and
    an ice detector which provides an ice-condition input, wherein the ice condition input includes a thickness of ice on a surface of the at least one ice-susceptible region of the aircraft;
    wherein the optimizer uses the ice-condition input and the historical data of ice-condition input to generate the instructions, wherein the instructions include operating in a deicing cycle when the thickness of the ice is below a first threshold thickness and above a second threshold thickness.

2. An ice protection system as set forth in claim 1, wherein the optimizer uses the ice-condition input to determine an optimum power level and conveys this power level in the instructions, and wherein each controller controls power supply at a level corresponding to these instructions.

3. An ice protection system as set forth in claim 2, wherein the ice protection device operates in a fully-evaporative anti-icing mode.

4. An ice protection system as set forth in claim 3, characterized by the optimizer not using input from surface temperature sensors to determine an optimum power level.

5. An ice protection system as set forth in claim 3, wherein the ice detector is an optical ice detector which analyzes circularly polarized light scattered from airborne cloud particles.

6. An ice protection system as set forth in claim 1, adapted to protect a plurality of ice-susceptible regions of the aircraft, wherein the optimizer uses the ice-condition input to determine icing severity and compares this determination to a threshold to produce the instructions; and wherein the threshold varies among the ice protection devices.

7. An ice protection system as set forth in claim 6, characterized by the absence of temperature sensors on the ice-susceptible regions.

8. An ice protection system as set forth in claim 6, wherein the ice detector is an optical ice detector which analyzes circularly polarized light scattered from airborne cloud particles.

9. An ice protection system as set forth in claim 1, wherein the optimizer comprises an algorithm contained within a microprocessor installed in each controller.

10. An ice protection system as set forth in claim 1, wherein each ice protection device comprises a heating element which converts electric power into heat.

* * * * *